(12) United States Patent
Endo et al.

(10) Patent No.: US 7,950,742 B2
(45) Date of Patent: May 31, 2011

(54) CONNECTING APPARATUSES FOR VEHICULAR SEATS

(75) Inventors: Takayuki Endo, Toyota (JP); Hideki Uramichi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 34 days.

(21) Appl. No.: 12/408,947

(22) Filed: Mar. 23, 2009

(65) Prior Publication Data
US 2009/0250989 A1 Oct. 8, 2009

(30) Foreign Application Priority Data
Apr. 8, 2008 (JP) ................................ 2008-100046

(51) Int. Cl.
*B60N 2/02* (2006.01)
(52) U.S. Cl. .................... 297/367; 297/366; 297/354.12
(58) Field of Classification Search .................. 297/367, 297/366, 354.12
See application file for complete search history.

(56) References Cited

U.S. PATENT DOCUMENTS

| | | | | |
|---|---|---|---|---|
| 3,737,946 A * | 6/1973 | Giuliani | ............................ | 16/325 |
| 4,087,885 A * | 5/1978 | Gillentine | ........................ | 16/325 |
| 4,997,223 A * | 3/1991 | Croft | .......................... | 297/367 R |
| 5,597,206 A | 1/1997 | Ainsworth et al. | | |
| 5,779,313 A | 7/1998 | Rohee | | |
| 6,464,299 B1 | 10/2002 | Castagna | | |
| 6,488,338 B1 * | 12/2002 | Hoshihara | .................. | 297/367 R |
| 6,926,362 B2 | 8/2005 | Kroner et al. | | |
| 7,152,923 B2 | 12/2006 | Charras et al. | | |
| 7,475,945 B2 * | 1/2009 | Reubeuze et al. | ......... | 297/367 R |
| 2003/0025376 A1 * | 2/2003 | Moriyama et al. | ............. | 297/367 |
| 2006/0022503 A1 * | 2/2006 | Reubeuze et al. | ........ | 297/378.12 |
| 2009/0134682 A1 | 5/2009 | Andou et al. | | |

FOREIGN PATENT DOCUMENTS

| | | |
|---|---|---|
| CN | 2712705 | 7/2005 |
| EP | 0795435 | 10/1999 |
| EP | 0872375 | 5/2003 |
| EP | 0976606 | 6/2004 |
| JP | 2007-130237 A | 5/2007 |

OTHER PUBLICATIONS

U.S. Appl. No. 12/416,403 to Endo et al., filed Apr. 1, 2009.
U.S. Appl. No. 12/375,588 to Mitsuhashi et al., filed Jan. 29, 2009.
U.S. Appl. No. 12/341,258 to Yamagishi, filed Dec. 22, 2008.
U.S. Appl. No. 12/341,047 to Yamagishi, filed Dec. 22, 2008.
U.S. Appl. No. 12/088,012 to Kuroda et al., filed Mar. 25, 2008.
China Office action, dated Dec. 6, 2010 along with an english translation thereof.

* cited by examiner

*Primary Examiner* — Laurie K Cranmer
(74) *Attorney, Agent, or Firm* — Greenblum & Bernstein, P.L.C.

(57) ABSTRACT

A connecting apparatus for rotatably connecting two object members of a vehicle seat relative to each other. The connecting apparatus may include first and second connecting members, a lock member and an operating member. The first and second connecting members are integrated to be able to rotate relative to each other. The lock member is able to lock the relative rotation between the connecting members by meshing outer peripheral teeth with inner peripheral teeth formed at the second connecting member. The operating member moves the lock member between a mesh state and a release state.

4 Claims, 12 Drawing Sheets

CONNECTING APPARATUSES FOR VEHICULAR SEATS

This application claims priority to Japanese patent application serial number 2008-100046, the contents of which are incorporated herein by reference.

BACKGROUND OF THE INVENTION

1. Field of the Invention

The present invention relates to a connecting apparatus for rotatably connecting two object members of a vehicular seat relative to each other.

2. Description of the Related Art

Prior configurations have included a vehicular seat in which a seat back is connected to a seat cushion by a reclining apparatus. The reclining apparatus can adjust a back rest angle of the seat back relative to the seat cushion. The reclining apparatus of the background art includes a ratchet and a guide. The ratchet has a circular disk shape and is integrally connected to a frame portion of the seat back. The guide has a circular disk shape and is integrally connected to a frame portion of the seat cushion. The ratchet and the guide are rotatably combined around an axial.

Poles are provided between the ratchet and the guide for locking the relative rotation of the ratchet and the guide. The pole is supported to be able to move relative to the guide only to inner and outer sides in a radius direction. The pole includes outer peripheral teeth formed on an outer peripheral face thereof. The ratchet includes inner peripheral teeth formed on an inner peripheral surface of a cylinder portion. By bringing the outer peripheral teeth in mesh with the inner peripheral teeth, the relative rotation between the ratchet and the guide is locked.

However, in order to downsize the reclining apparatus, when, for example, an outer diameter of the ratchet is reduced, a wall thickness in the radius direction of the cylinder portion of the ratchet with which the outer peripheral teeth of the pole are brought in mesh becomes thin, or the inner peripheral teeth are reduced. A lock strength of the reclining apparatus can be reduced thereby. Therefore, there is need in the art for a connecting apparatus of a vehicular seat capable of guaranteeing a lock strength thereof even when downsized.

SUMMARY OF THE INVENTION

One aspect of the present invention can include a connecting apparatus having first and second connecting members, a lock member and an operating member. The first and second connecting members are integrated in a direction of matching disks thereof to be able to rotate relative to each other. The first connecting member integrally is connected to one of two object members of a vehicular seat. The second connecting member integrally is connected to the other one of the two object members. The lock member is arranged between the connecting members and is integrated to the first connecting member to be movably supported in a circumferential direction. The lock member is able to lock the relative rotation between the connecting members by bringing an outer peripheral teeth face in mesh with an inner peripheral teeth face formed at the second connecting member. The operating member moves the lock member between a mesh state and a release state. In the mesh state, the outer peripheral teeth face of the lock member is in mesh with the inner peripheral teeth face of the second connecting member. In the release state, the outer peripheral teeth face is released from the inner peripheral teeth face. The second connecting member is formed with a support portion receiving in a circular ring portion formed at the first connecting member in the axial direction at a position on an outer side in the radius direction of the inner peripheral teeth face to be brought into a state of surrounding the circular ring portion from an outer peripheral side to be brought into a state of supporting each other to be able to rotate relative to each other.

Therefore, the first connecting member has the circular ring portion received by the support portion formed at the second connecting member in the axial direction. And the first connecting member is integrated to the support portion in a state of being supported by each other on inner and outer sides rotatably. The support portion surrounds the circular ring portion on an outer peripheral side thereof at a position on an outer side in the radius direction of the inner peripheral teeth face. Therefore, a wall thickness in the radius direction of a peripheral edge portion of the inner peripheral teeth face is operated to increase. Therefore, a substantial wall thickness in the radius direction of the peripheral edge portion of the inner peripheral teeth face brought in mesh with and locked by the lock member can be increased, and therefore, a support strength in mesh locking is increased, and even when the connecting apparatus is downsized, the lock strength can be guaranteed.

DETAILED DESCRIPTION OF THE INVENTION

Each of the additional features and teachings disclosed above and below may be utilized separately or in conjunction with other features and teachings to provide improved connecting apparatuses. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 2:
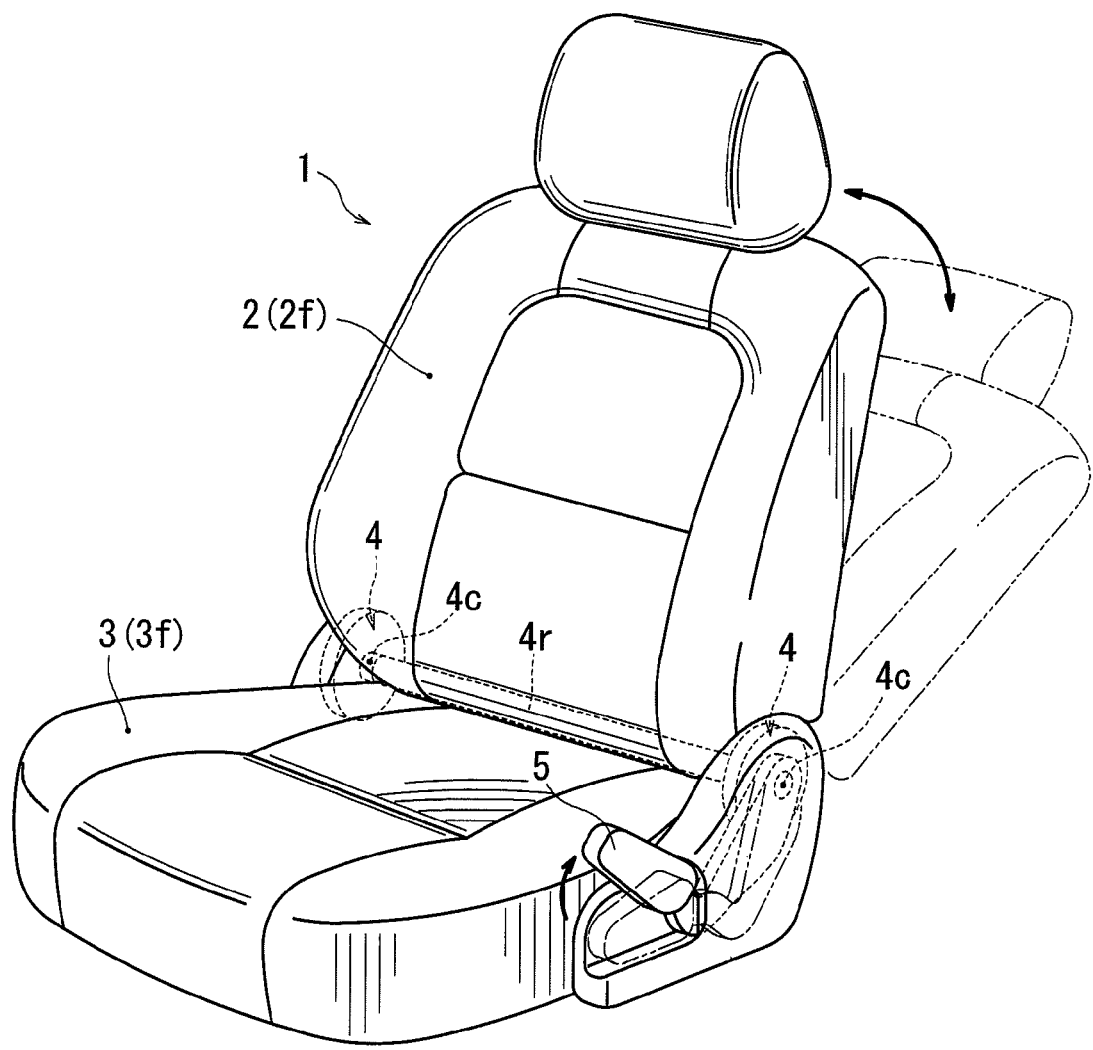
FIG. 2 is a perspective view of a vehicular seat.

As shown in FIG. 2, a vehicular seat 1 includes a seat back 2 constituting a back rest, a pair of left and right reclining apparatus (connecting apparatus) 4 arranged at the positions at lower portions of both sides of the seat back 2, and a seat cushion 3 constituting a seating portion connected to the seat back 2 by the reclining apparatuses 4.

The reclining apparatuses 4 include operating shafts 4c and 4c inserted to inner portions thereof for carrying out a switching operation of locking and releasing. The operating shafts 4c and 4c are connected integrally to each other by a connecting rod 4r. Thereby, at the respective reclining apparatuses 4, the switching operation of locking and releasing can respectively be carried out in synch. In the locking state, a back rest angle of the seat back 2 is fixed. In the releasing state, the back rest angle can be adjusted by releasing from the locking state. The respective reclining apparatuses 4 are normally maintained in an operating state locked by a bias force.

As shown in FIG. 2, according to the respective reclining apparatuses 4, the lock states can be released by pulling up an operating lever 5 provided at a position of a side portion of the seat cushion 3. Thereby, the state of fixing the back rest angle of the seat back 2 is released to bring about a state capable of carrying out an adjusting operation of the back rest angle. When the back rest angle of the seat back 2 is adjusted, and the operation of releasing the operating lever 5 is stopped, the respective reclining apparatuses 4 are brought back to the locking state by an urging member. Thereby, the seat back 2 is fixed to a position of the adjusted back rest angle.

The seat back 2 is biased always in a forward falling pivoting direction by an urge force of an urge spring, not illustrated, positioned between the seat back 2 and the seat cushion 3. Therefore, in a state in which a user is not seated on the vehicular seat 1, by releasing the state of locking the respective reclining apparatuses 4, the seat back 2 is able to fall forward by the urging to overlap an upper face portion of the seat cushion 3.

The respective reclining apparatuses 4 are brought back to the locking state by stopping the operation of releasing the operating lever 5 when the seat back 2 is disposed in an angle region used as a back rest. The reclining apparatuses 4 include lock zones and free zones within a rotational angle region. In the lock zones, the respective reclining apparatuses 4 are brought back to the locking state when the operation of releasing the operating lever 5 is stopped. In the free zones, the respective reclining apparatuses 4 are not brought back to the locking states even when the operation of releasing the operating lever 5 is stopped.

The lock zone is normally set to the angle region of using the seat back 2 as the back rest. Specifically, the lock zone is set to an angle region for making the seat back 2 fall to a rear side from an angle position at which the seat back 2 is brought into an upright attitude. On the other hand, the free zone is set to an angle region of a forward falling attitude at which the seat back 2 is not used as the back rest. Specifically, the free zone is set to an angle region of making the seat back 2 fall to a front side from the angle position of constituting the upright attitude.

Therefore, when the seat back 2 is made to fall forward, when the seat back 2 is made to fall forward even by a small amount from the upright attitude by releasing the states of locking the respective reclining apparatuses 4, thereafter, even when the releasing operation is stopped, the seat back 2 is made to fall forward spontaneously to a position of folding the seat back 2 on the upper face portion of the seat cushion 3. Constitutions of the reclining apparatuses 4 will be explained in details as follows. The reclining apparatuses 4 are constructed by being approximately symmetric with each other in a left and right direction. Therefore, in the following, an explanation will be given only of the constitution of the reclining apparatus 4 on one side indicated on a right side of paper face of FIG. 2.

Figure 1:
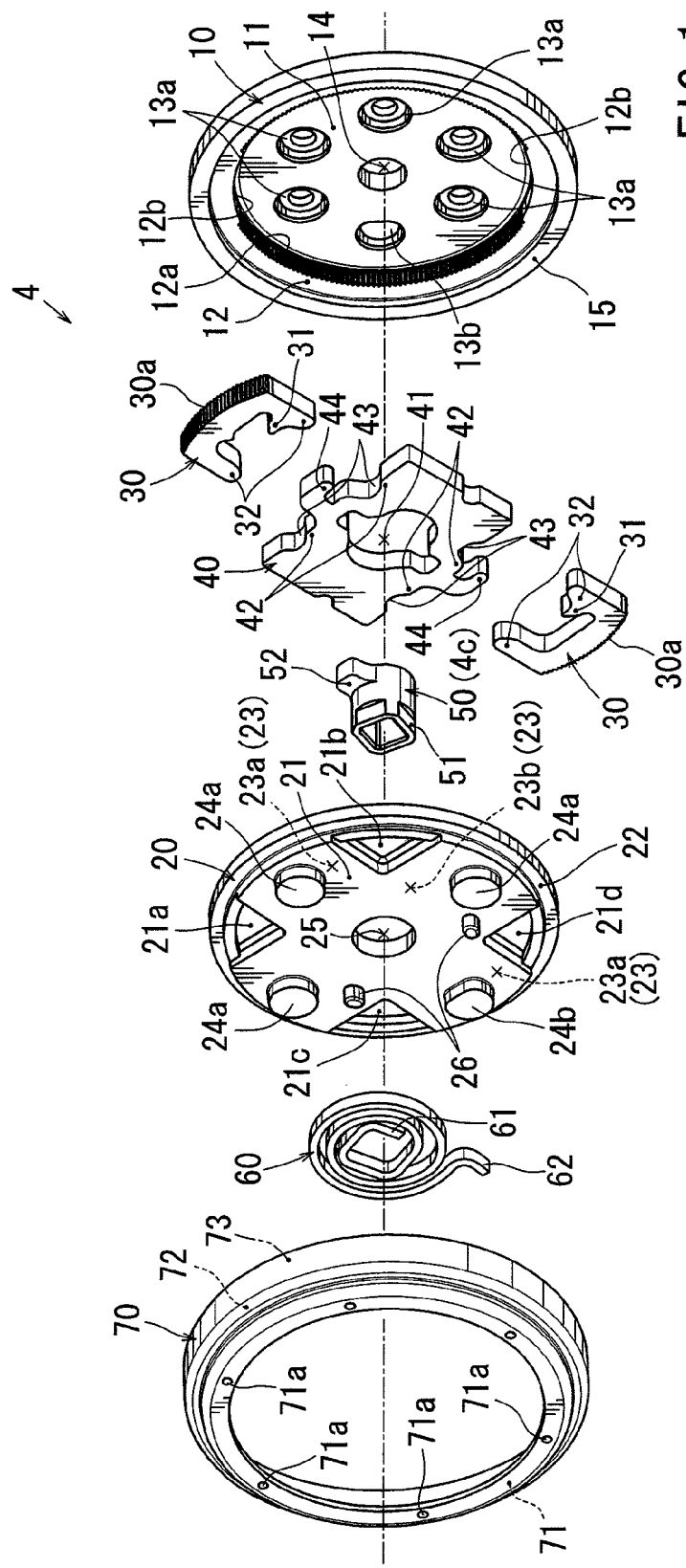
FIG. 1 is an exploded view of a reclining apparatus of one aspect of the invention.

As shown in FIG. 1, the reclining apparatus 4 is constituted by integrating a ratchet 10, a guide 20, a pair of upper and lower poles 30, a slide cam 40, a hinge cam 50, a coil spring 60 and a holding member 70. The ratchet 10 and the guide 20 are formed in shapes of circular disks. The poles 30 and the slide cam 40 are arranged between circular disk faces of the ratchet 10 and the guide 20. The hinge cam 50 may operate to move the slide cam 40. The coil spring 60 may urge to pivot the hinge cam 50. The holding member 70 may hold the ratchet 10 and the guide 20 in a plate thickness direction (axial direction) to stop detachment thereof into one. The guide 20 constitutes a first connecting member, the ratchet 10 constitutes a second connecting member, the poles 30 constitute lock members, and the slide cam 40 constitutes an operating member.

Figure 5:
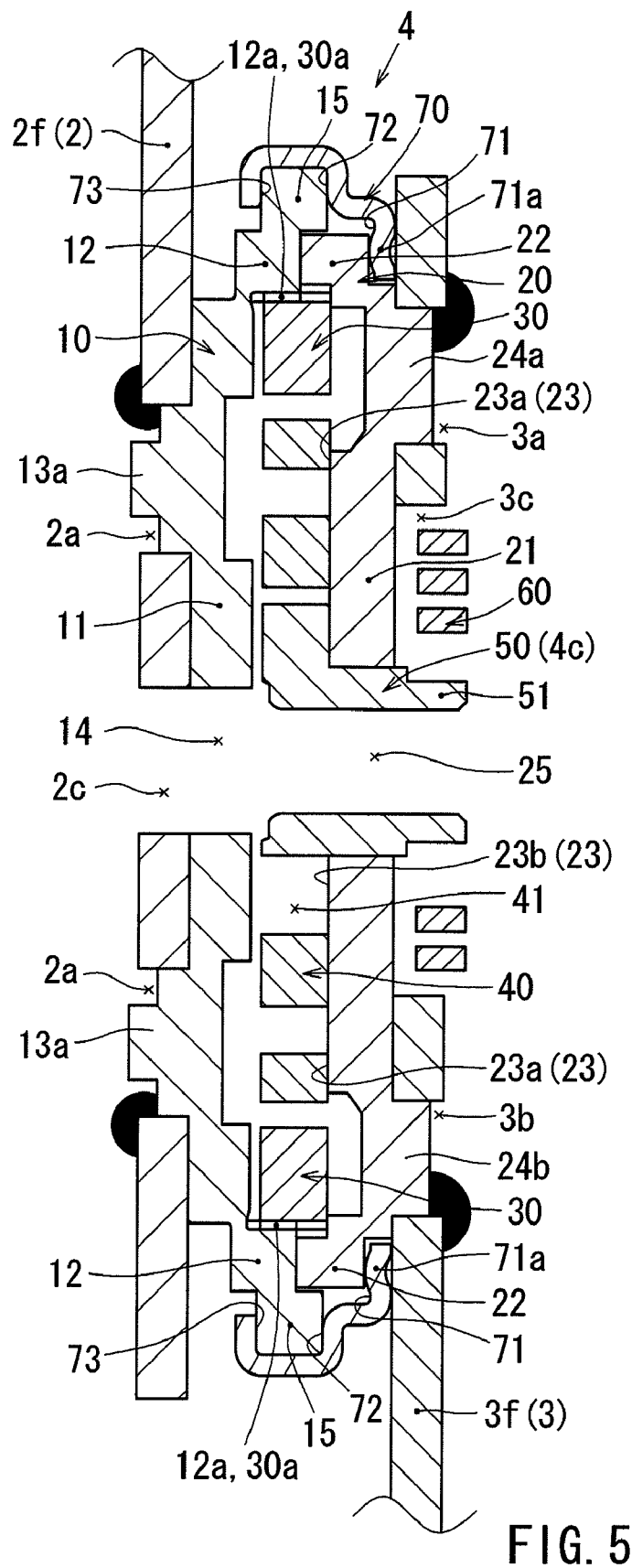
FIG. 5 is a cross-sectional view taken along line V-V in FIG. 4.

The ratchet 10 includes a circular cylinder portion 12 and a support portion 15 at an outer peripheral portion of a circular disk portion 11. The circular cylinder portion 12 and the support portion 15 have shapes of circular cylinders. They are arranged in the plate thickness direction and have a stepped difference therebetween. The circular cylinder portion 12 and the support portion 15 are formed by half blanking in the plate thickness direction of the ratchet 10. Thereby, as shown in FIG. 5, the support portion 15 is projected in the plate thickness direction more than the circular cylinder portion 12 by making a portion of a shape thereof overlap the circular cylinder portion 12 in the plate thickness direction.

The circular cylinder portion 12 and the support portion 15 are projected in the shape of the circular cylinders around a center of rotation of the ratchet 10. An inner peripheral face of the circular cylinder portion 12 is formed with an inner peripheral teeth face 12a having an inner teeth and a projected flat face 12b not having inner teeth. The projected flat faces 12b are formed at positions of two portions of the circular cylinder portion 12 constituting axis symmetry. An inner peripheral face of the projected flat face 12b constitutes a curved face which is projected to an inner side in a radius direction more than the inner peripheral teeth face 12a and is flat.

Figure 3:
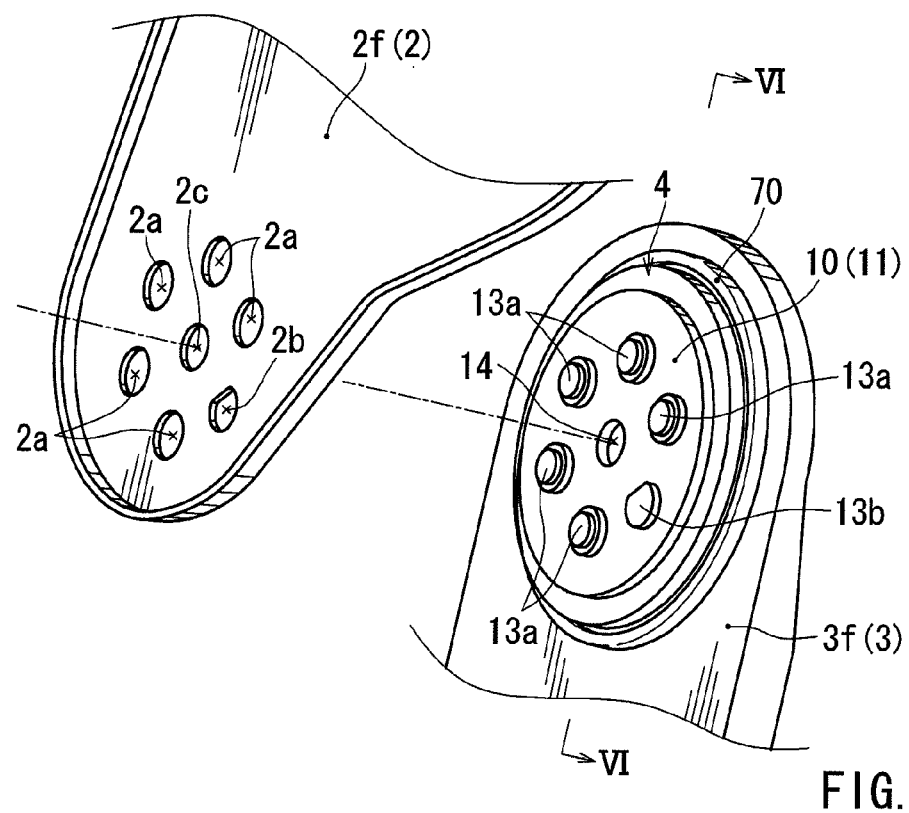
FIG. 3 is a perspective view of the reclining apparatus for showing how to connect the apparatus to a seat back.

Thereby, the rotational angle region of the ratchet 10 is set to the lock zone and the free zone. At a lock zone, the respective poles 30 are meshed with the inner peripheral teeth faces 12a. At the free zone, the projected flat faces 12b do not interfere with the poles 30 and the poles 30 are hampered from being meshed with the ratchet 10. As shown in FIG. 3, the ratchet 10 is integrally connected to the seat back 2 by bonding an outer disk face of the circular disk portion 11 with a plate face of a back frame 2f constituting a frame of the seat back 2. The back frame 2f corresponds to one side member of two object members of the invention.

The circular disk portion 11 of the ratchet 10 is formed with a plurality of dowels 13a and a D dowel 13b projected in shapes of circular cylinders from an outer disk face thereof. The dowels 13a and the D dowel 13b are aligned at equal intervals in a circumferential direction at positions proximate to an outer peripheral edge of the circular disk portion 11. The D dowel 13b is provided with a section in a shape of a character D notching a portion of the shape of the projected circular cylinder and differs from the dowel 13a projected in the shape of the circular cylinder in a shape thereof.

The back frame 2f is penetrated to form with a slit 2a and a D slit 2b capable of being fitted with the dowel 13a and the D dowel 13b. Therefore, by respectively fitting the dowel 13a and the D dowel 13b to the slit 2a and the D slit 2b of the back frame 2f and bonding these by welding, the ratchet 10 is integrally connected solidly to the back frame 2f (refer to FIG. 5).

As shown in FIG. 5, a center of the circular disk portion 11 of the ratchet 10 is formed with a through hole 14. The through hole 14 is inserted with the operating shaft 4c (refer to FIG. 2) for switching locking and releasing of the reclining apparatus 4. Also the back frame 2f is formed with a through hole 2c of the same object at a position on an axis line the same as that of the through hole 14.

As shown in FIG. 1, the guide 20 is provided with a shape of a circular disk having an outer diameter one size smaller than that of the ratchet 10. An outer peripheral edge of the circular disk portion 21 of the guide 20 is formed with a circular ring portion 22 projected in a shape of a circular cylinder in the plate thickness direction constituting a direction of being integrated to the ratchet 10. The circular ring portion 22 is formed by subjecting the guide 20 to half blanking in the plate thickness direction.

As shown in FIG. 5, the circular ring portion 22 is received by inside of a cylinder of the support portion 15 of the ratchet 10 in the axial direction. The circular ring portion 22 is set to a size of being installed to provide a gap between the circular ring portion 22 and the support portion 15. Therefore, by fitting to integrate the circular ring portion 22 of the guide 20 to inside of the cylinder of the support portion 15 of the ratchet 10, the circular ring portion 22 is surrounded by the support portion 15 from an outer peripheral side thereof. Thereby, the guide 20 can be rotated relative to the ratchet 10 by sliding with each other by a structure of fitting the circular ring portion 22 and the support portion 15.

Further, the circular ring portion 22 is integrated to the circular cylinder portion 12 of the ratchet 10 in a state of being opposed thereto in the axial direction. An inner diameter of the circular ring portion 22 is set to be larger than an inner diameter of the circular cylinder portion 12 of the ratchet 10. An inner peripheral face of the circular ring portion 22 is projected to an inner side in a radius direction more than the inner peripheral teeth face 12a of the circular cylinder portion 12 to be disposed so as not to hamper the poles 30 from being brought in mesh therewith. The circular ring portion 22 is projected in a shape of circular cylinder around a center of rotation of the guide 20.

Figure 4:
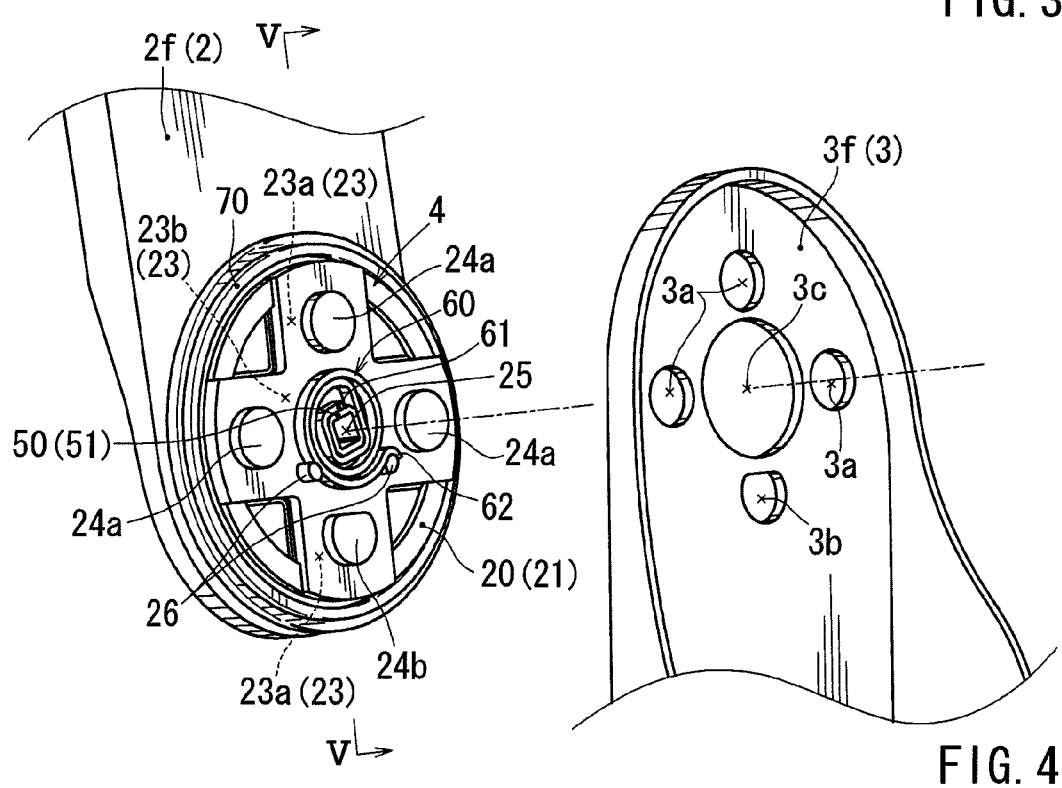
FIG. 4 is a perspective view of the reclining apparatus for showing how to connect the apparatus to a seat cushion.

As shown in FIG. 4, the guide 20 is integrally connected to the seat cushion 3 by bonding an outer disk face of the circular disk portion 21 to a plate face of a cushion frame 3f constituting a frame of the seat cushion 3. The cushion frame 3f corresponds to other side member of the two object members.

The circular disk portion 21 of the guide 20 is formed with a plurality of dowels 24a and a D dowel 24b projected in shapes of circular cylinders from an outer disk face thereof. The dowels 24a and the D dowel 24b are aligned at equal intervals in a circumferential direction at portions proximate to an outer peripheral edge of the circular disk portion 21. The D dowel 24b is provided with a section in a shape of a character D by notching a portion of a shape of a projected circular cylinder, and differs from the dowel 24a projected in the shape of the circular cylinder in a shape thereof.

The cushion frame 3f is penetrated to form with a slit 3a and a D slit 3b capable of fitting the dowel 24a and the D dowel 24b. Therefore, by respectively fitting the dowel 24a and the D dowel 24b to the slit 3a and the D slit 3b of the cushion frame 3f and bonding these by welding, the guide 20 is integrally connected solidly to the cushion frame 3f (refer to FIG. 5).

A center of the circular disk portion 21 of the guide 20 is formed with a through hole 25. The through hole 25 is inserted into the operating shaft 4c (refer to FIG. 2) for carrying out the switching operation of locking and releasing of the reclining apparatus 4. Also the cushion frame 3f is formed with a through hole 3c of the same object at a position on an axis line the same as that of the through hole 25. The through hole 3c is provided with a shape of containing the coil spring 60 inside of the hole.

As shown in FIG. 1, a circular disk portion 21 of the guide 20 is formed with a guide groove 23 recessing an inner disk face a shape of a sign '+' in the plate thickness direction. The guide groove 23 is formed by subjecting the circular disk portion 21 to half blanking in the plate thickness direction in the shape of the sign '+'. The dowel 24a and the D dowel 24b are formed by being respectively projected at positions on an outer disk face formed with the guide grooves 23. The guide groove 23 includes pole grooves 23a on an upper side and a lower side of FIG. 1 and the respective poles 30 are contained in the pole grooves 23a.

Figure 6:
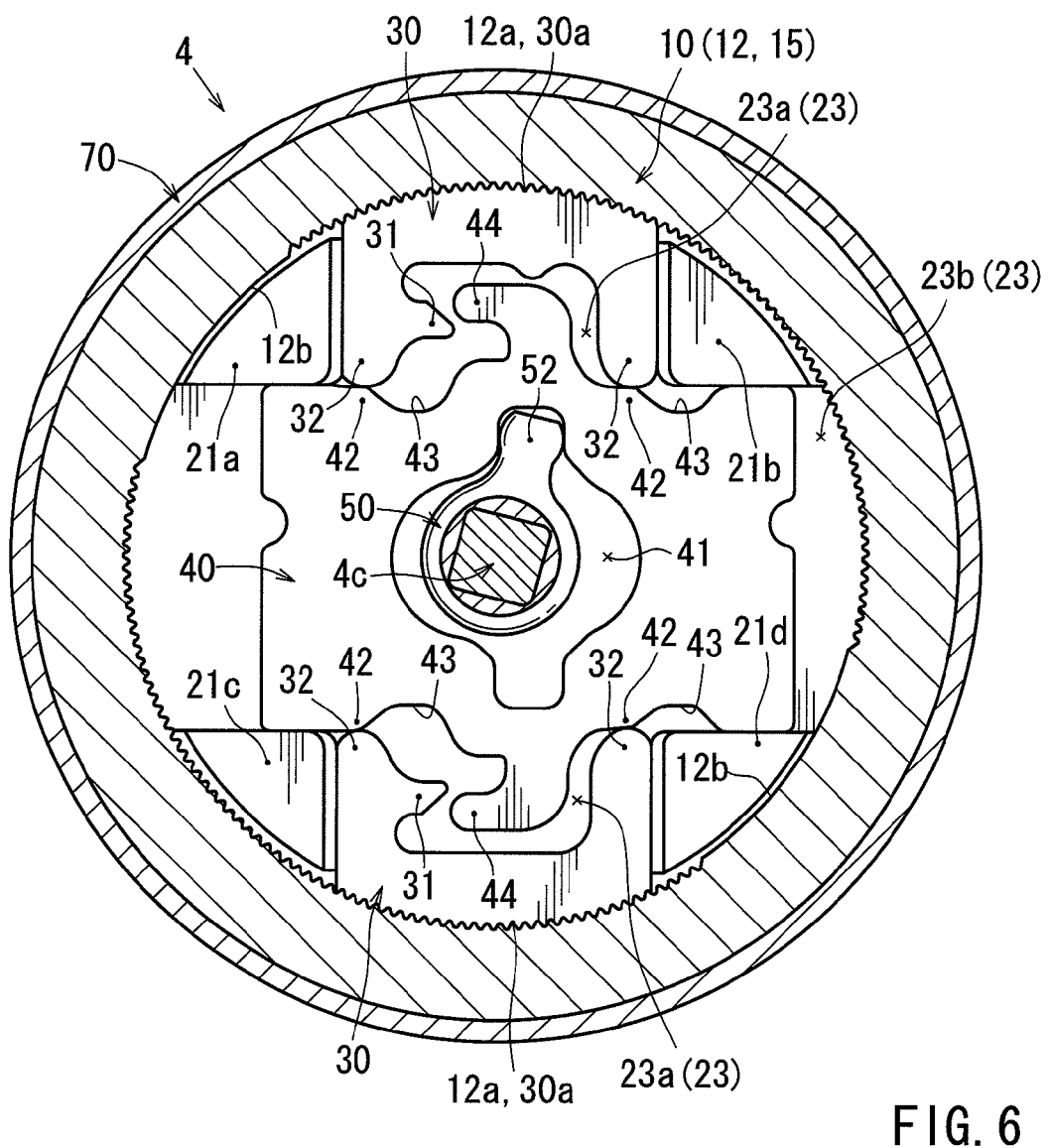
FIG. 6 is a cross-sectional view taken along line VI-VI in FIG. 3 for showing the reclining apparatus in a locking state.

As shown in FIG. 6, the pole grooves 23a guide the poles 30 by guide walls 21a through 21d constituting side walls on both left and right sides. The poles 30 slide only to inner and outer sides in a radius direction of the guide 20 (up and down direction of illustration) along groove shapes of the pole grooves 23a. The guide groove 23 includes the pole grooves 23a and a slide cam groove 23b in one connection. The slide cam groove 23b is extended in a left and right transverse direction of FIG. 7 and can contain the slide cam 40 inside thereof.

The slide cam groove 23b guides the slide cam 40 by the guide walls 21a through 21d constituting the side walls on the both upper and lower sides. The slide cam 40 slides only in a left and right direction of FIG. 7 orthogonal to the direction of sliding the poles 30 relative to the guide 20 along a groove shape of the slide cam groove 23b. As shown in FIG. 1, the circular disk portion 21 of the guide 20 is formed with spring hanging portions 26 projected in shapes of pins from an outer disk face thereof. An outer end 62 of the coil spring 60 is hung on the spring hanging portions 26, and the spring hanging portions 26 are formed at two portions in a circumferential direction to be able to select a hanging position.

The poles 30 are contained at inner portions of the respective pole grooves 23a formed at the guide 20. The poles 30 are provided with shapes approximately symmetrical with each other in an up and down direction. Outer peripheral edges of the respective poles 30 are provided with shapes bent in a shape of a circular arc matching with an inner peripheral face of the circular cylinder portion 12 of the ratchet 10. Outer peripheral faces thereof bent in the shape of the circular arc are formed with outer peripheral teeth faces 30a having outer teeth capable of being meshed with the inner peripheral teeth faces 12a formed at the inner peripheral face of the circular cylinder portion 12.

Therefore, as shown in FIG. 6, the respective poles 30 are pressed by the slide cam 40 to be operated to slide to outer sides in a radius direction, thereby, the respective outer peripheral teeth faces 30a are pressed to the inner peripheral teeth faces 12a of the ratchet 10 to be meshed therewith. Thereby, the respective poles 30 and the ratchet 10 are brought into a state of being locked in a circumferential direction by forces of being meshed with each other. However, the respective poles 30 can slide only to inner and outer sides in the radius direction by being guided by the guide walls 21a through 21d in a relationship thereof with the guide 20.

Figure 7:
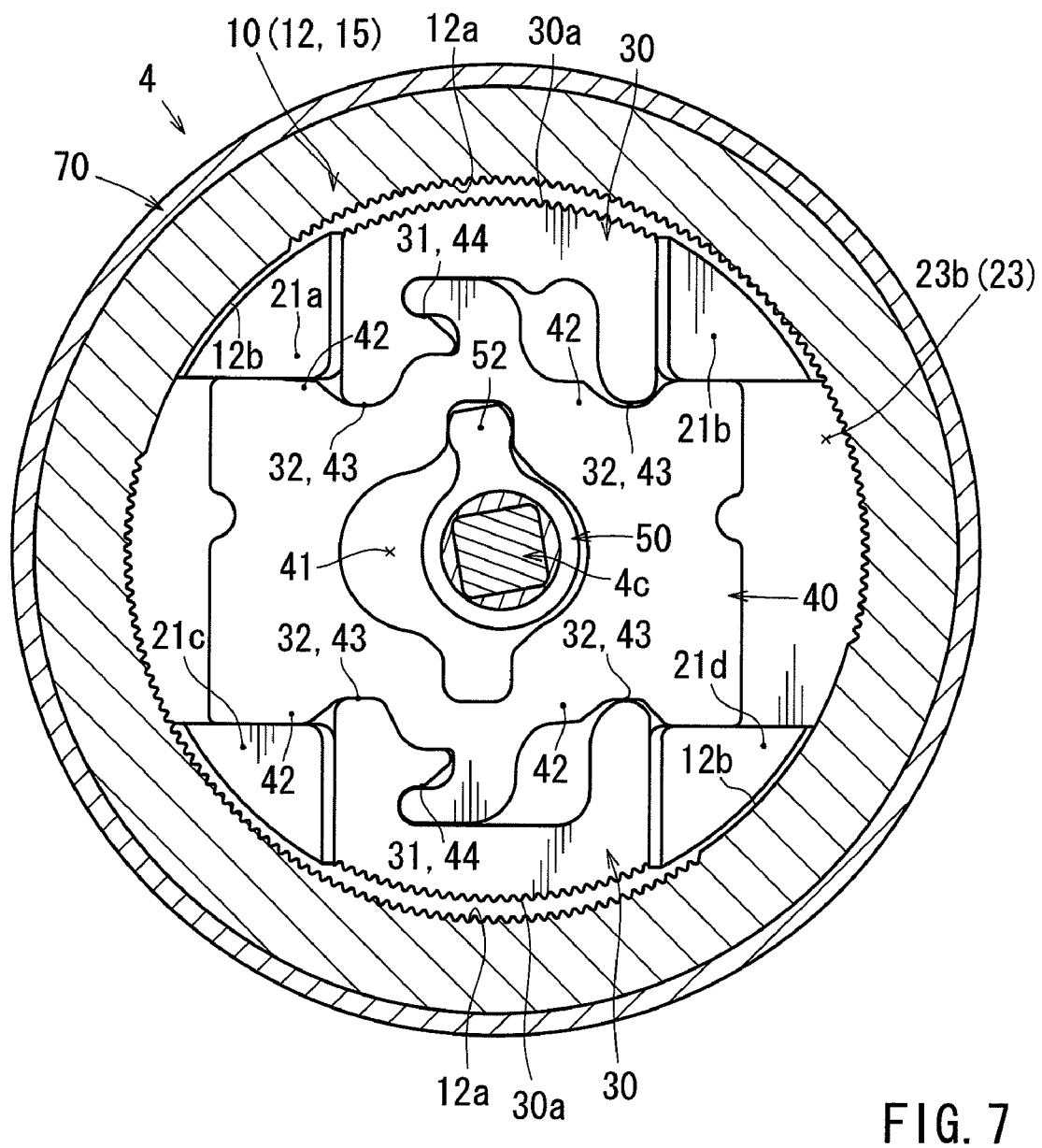
FIG. 7 is a cross-sectional view of the reclining apparatus in a releasing state.

Therefore, a rotational movement of the ratchet 10 is restricted relative to the guide 20 by way of the respective poles 30. Thereby, rotation of the reclining apparatus 4 is locked. As shown in FIG. 7, the state pf locking the rotation of the reclining apparatus 4 is released by being released from being meshed with the ratchet 10 by pulling the respective poles 30 to inner sides in the radius direction.

An operation of sliding the respective poles 30 to inner and outer sides in the radius direction is carried out by an operation of sliding the slide cam 40 arranged between the poles 30. As shown in FIG. 1, the slide cam 40 is contained at an inner portion of the slide cam groove 23b formed at the guide 20. The slide cam 40 is provided with a shape symmetric in the up and down direction and includes shoulder portions 42 for pushing out the respective poles 30 to outer sides in the radius direction and hooks 44 for pulling the respective poles 30 to inner sides in the radius direction.

The poles 30 are provided with a gate-type shape of partially hollowing a shape on an inner side in the radius direction. The respective poles 30 are pushed to outer sides in the radius direction by the slide cam 40 by bringing leg portions 32 constituting two legs of the gate type into contact with upper and lower edges of the slide cam 40. Specifically, as shown in FIG. 6, the respective poles 30 are pushed out to the outer sides in the radius direction by butting the respective leg portions 32 to the respective shoulder portions 42 by sliding the slide cam 40 to a right side.

Thereby, the outer peripheral teeth faces 30a of the respective poles 30 are brought in mesh with the inner peripheral teeth faces 12a of the ratchet 10. As shown in FIG. 7, the poles 30 include hanging portions 31 on an inner side of the gate type, by sliding the slide cam 40 to a left side, the hooks 44 of the slide cam 40 are caught by the hanging portions 31, and the respective poles 30 are pulled to inner sides in the radius direction. The respective poles 30 are released from being meshed with the ratchet 10 by pulling the respective leg portions 32 to inner portions of groove portions 43 formed at right positions of the respective shoulder portions 42.

The respective groove portions 43 are smoothly recessed from the respective shoulder portions 42. Thereby, as shown in FIG. 6, according to the respective poles 30, the slide cam 40 is slid to the right side, and the leg portions 32 ride over the respective shoulder portions 42 by being guided to move along shapes of inclined faces of the respective groove portions 43. An operation of sliding the slide cam 40 in a left and right direction is carried out by rotating of the hinge cam 50.

As shown in FIG. 1, the hinge cam 50 is engaged to inside of the cam hole 41 penetrated to form at the center portion of the slide cam 40. The hinge cam 50 is always biased in the counterclockwise direction by an urge force of the coil spring 60 hung between the hinge cam 50 and the guide 20. As shown in FIG. 4, an inner end 61 of the coil spring 60 is hung on a spring hanging portion 51 of the hinge cam 50 in a state of being twisted previously, and the outer end 62 is hung on the spring hanging portion 26 of the guide 20.

Thereby, as shown in FIG. 6, the hinge cam 50 presses the slide cam 40 from a side of an inner peripheral face of the cam hole 41 to slide to the right side always by an operating projection 52 projected to be formed at an outer peripheral portion thereof. Thereby, the respective poles 30 are normally brought into a state in which the respective leg portions 32 ride over the respective shoulder portions 42 of the slide cam 40 to be meshed with the ratchet 10.

The hinge cam 50 is integrally connected to the operating shaft 4c shown in FIG. 2. Thereby, the hinge cam 50 is pivoted in the clockwise direction of FIG. 1 (counterclockwise direction of FIG. 6) against an urging of the coil spring 60 shown in FIG. 1 by pulling up the operating lever 5. Thereby, as shown in FIG. 7, the slide cam 40 is slid to the left side and the respective poles 30 are released from being meshed with the ratchet 10.

As shown in FIG. 1, the holding member 70 is formed by punching a thin steel sheet in a ring-like shape and half blanking process in the axial direction. The holding member 70 is provided with a seat face portion in a shape of a flange having a face in the axial direction at one end on left front side. The seat face portion is provided with faces in two stages in the axial direction, a first bottom face 71 in a ring-like shape is formed on an inner diameter side, and a second bottom face 72 in a ring-like shape is formed at a position raised in a shape of a stepped difference in the axial direction on an outer diameter side.

As shown in FIG. 5, the guide 20 is inserted to inside of the circular cylinder of the holding member 70, and the first bottom face (seat face portion) 71 faces the outer disk face of the circular ring portion 22 of the guide 20 in the axial direction. The ratchet 10 is inserted inside of the circular cylinder of the holding member 70, and the second bottom face 72 faces the inner disk face of the support portion 15 in the axial direction. Therefore, by inserting the guide 20 to inside of the circular cylinder of the holding member 70 in the axial direction, the circular ring portion 22 contacts with the first bottom face 71, and the guide 20 is set at the position.

The ratchet 10 is inserted to inside of the circular cylinder of the holding member 70 in the axial direction, the support portion 15 contacts with the second bottom face 72, and the position of the ratchet 10 is set at the position. The guide 20 and the ratchet 10 are inserted in the holding member 70 from an opening end portion of the holding member 70. The opening end portion of the holding member 70 is bent (or calked) to the inner side in the radius direction to face the outer disk face of the support portion 15. Thus the holding member 70 may hold the support portion 15 and the guide 20 in the axial direction.

Thereby, outer peripheral portions of the ratchet 10 and the guide 20 are held in the axial direction by the first bottom face 71 and the second bottom face 72 and a fold curve face 73 processed to fold to bend of the holding member 70 to be stopped from being detached. The circular cylinder portion 12 of the ratchet 10 and the first bottom face 71 of the holding member 70 held the circular ring portion 22 of the guide 20 with a small gap in the axial direction. Thereby, the guide 20 can smoothly rotate relative to the ratchet 10 without being hampered by a sliding friction with the holding member 70.

The first bottom face 71 is formed with projected portions 71a projected in shapes of points in the axial direction from a face thereof on an inner disk side at a plurality of portions in a peripheral direction thereof. Thereby, the circular ring portion 22 of the guide 20 contacts with the first bottom face 71 at the respective projected portions 71a and sliding resistance is restrained to be small.

Figure 8:
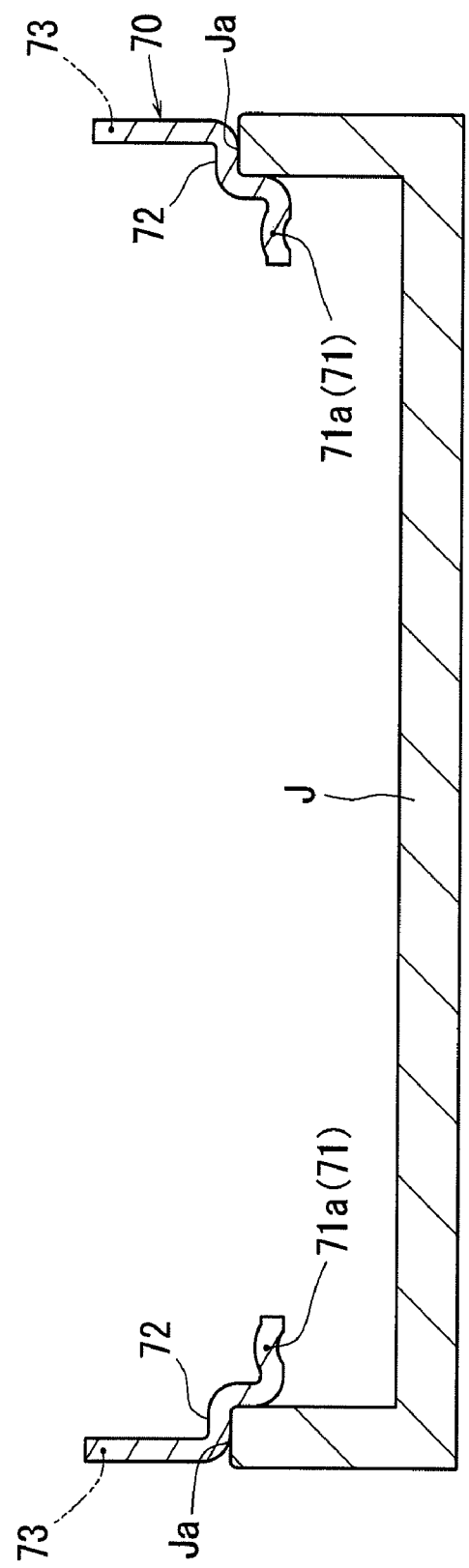
FIG. 8 is a process view for showing an assembly process of a holding member.

The reclining apparatus 4 is assembled by using an integrating jig J as shown in FIGS. 8 to 12. The holding member 70 is set on the jig J, and the respective constituent parts of the reclining apparatus 4 are successively set on the holding member 70 in a gravitational force direction. Described below in detail, first, as shown in FIG. 8, the holding member 70 is set on the integrating jig J such that the opening portion on the side of the receiving port is directed to an upper side. A support face Ja of the integrating jig J contacts with a back side face of the second bottom face 72 in the axial direction.

Figure 9:
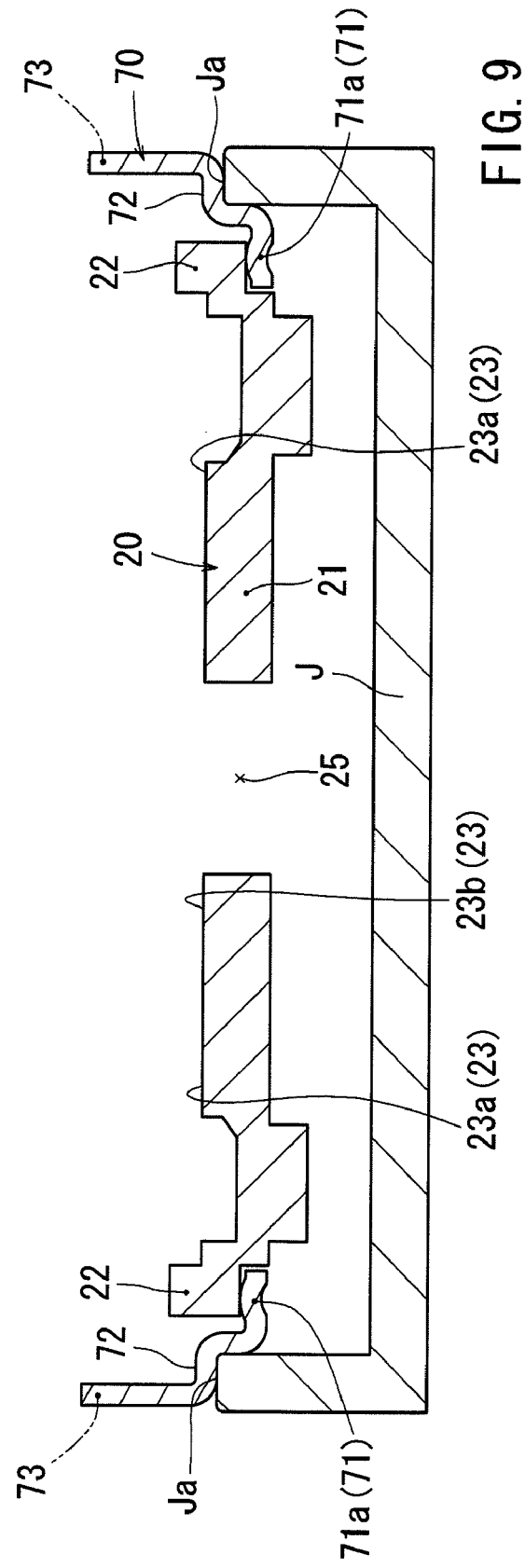
FIG. 9 is a process view for showing an assembly process of a guide member.
Figure 10:
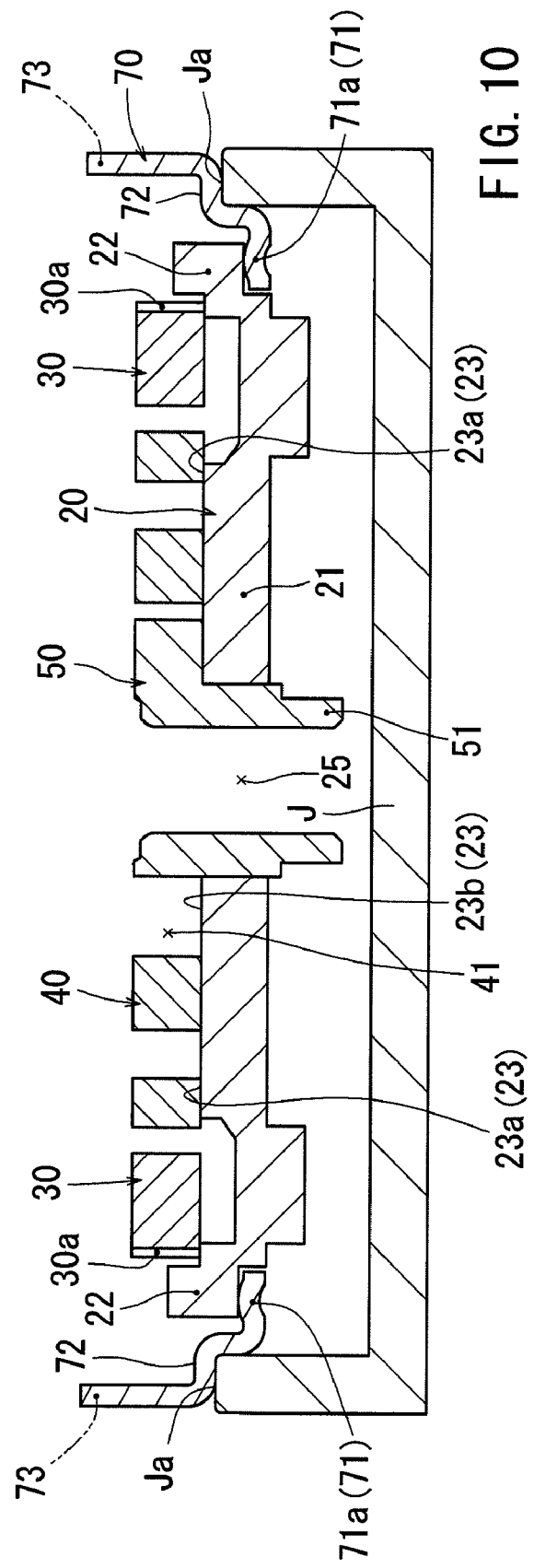
FIG. 10 is a process view for showing an assembly process of each locking members.

As shown in FIG. 9, the guide 20 is inserted in the inner portion of the circular cylinder of the holding member 70. Thus the outer disk face of the circular ring portion 22 contacts with the first bottom face 71 of the holding member 70 at the projected portions 71a. The guide 20 is set at the position relative to the holding member 70. Next, as shown in FIG. 10, the poles 30, the slide cam 40 and the hinge cam 50 are mounted onto the circular disk portion 21 of the guide 20. The respective poles 30 are contained in the pole grooves 23a formed at the guide 20 and positioned relative to the guide 20.

Figure 11:
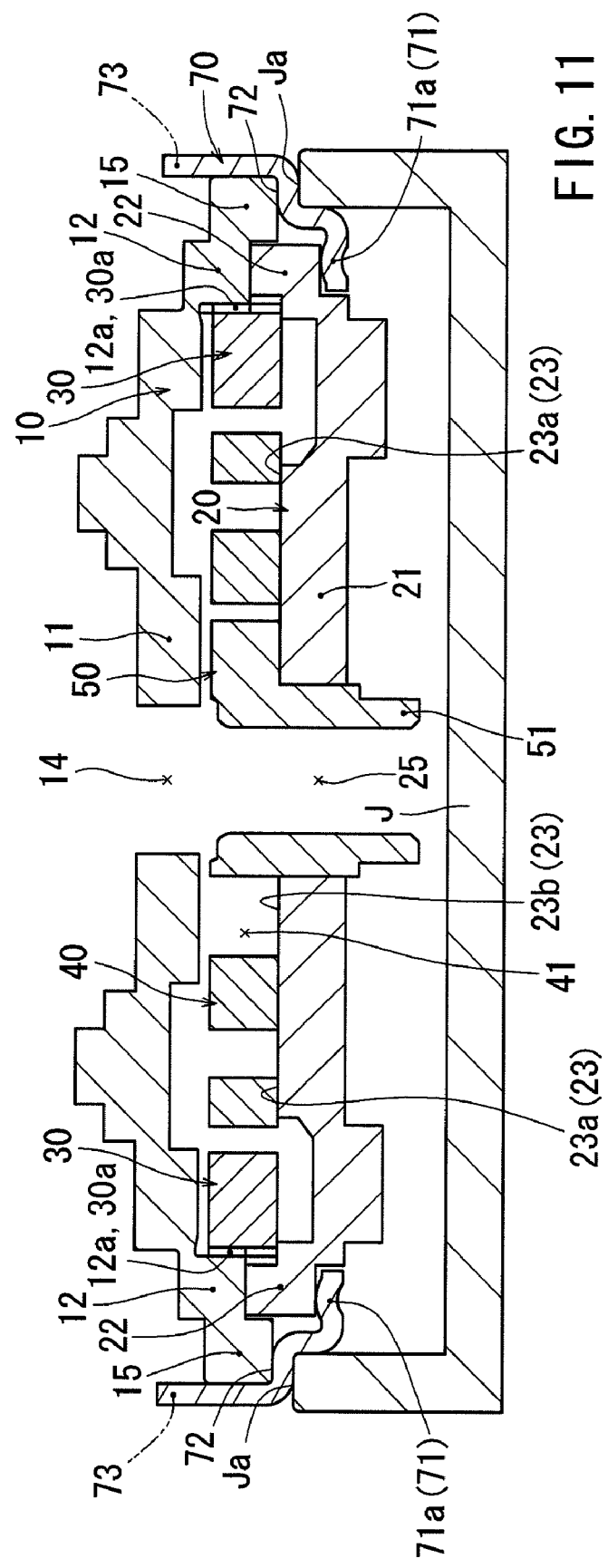
FIG. 11 is a process view for showing an assembly process of a ratchet.

The slide cam 40 is positioned and contained at inside of the slide cam groove 23b of the guide 20. The hinge cam 50 is positioned and inserted to the cam hole 41 of the slide cam 40 and the through hole 25 of the guide 20. Next, as shown in FIG. 11, the ratchet 10 is set on the circular ring portion 22 of the guide 20.

Figure 12:
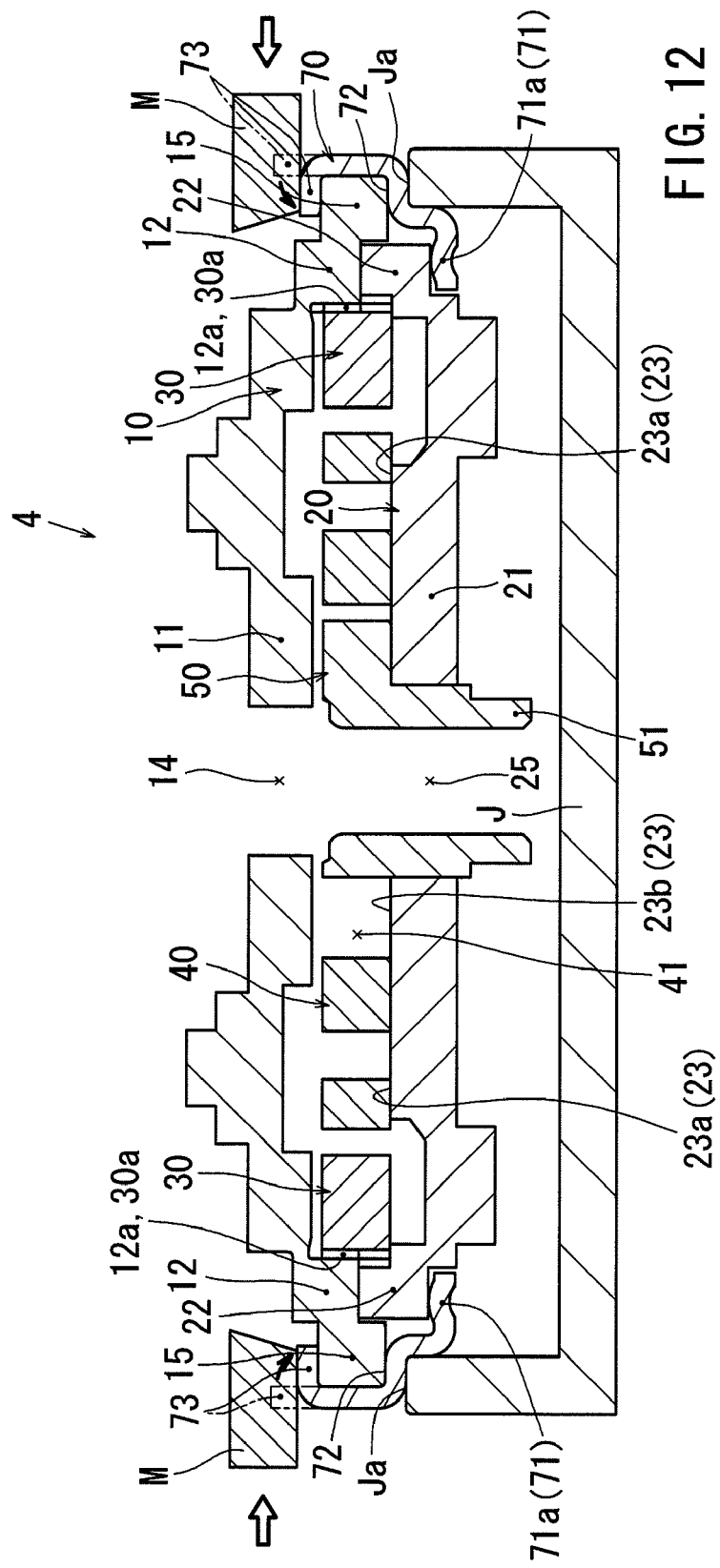
FIG. 12 is a process view for showing a calking process of the holding member.

The circular ring portion 22 of the guide 20 is fit inside of the circular cylinder of the support portion 15. The support portion 15 contacts with the second bottom face 72 of the holding member 70. Next, as shown in FIG. 12, an end portion of the opening on the side of the receiving port of the holding member 70 is folded to bend to the inner side in the radius direction by a calking machine M to be in line with (to be calked to) the outer disk face of the support portion 15 of the ratchet 10. Thus the holding member 70 prevents the ratchet 10 and the guide 20 from being detached.

The calking processing of the opening end portion of the holding member 70 is carried out in a state of being supported by the support face Ja of the integrating jig J contacting the back side face of the second bottom face 72. Therefore, the calking processing is carried out accurately. In this way, the reclining apparatus 4 can be integrated by successively setting respective constituent parts in the gravitational force direction. And the reclining apparatus 4 can be integrated in the state of being prevented from being detached without carrying out a reversing operation for making a total of the constituent parts upside down in the midst of the integration process.

As described above, the guide (first connecting member) 20 has the circular ring portion 22 received by the support portion 15 formed at the ratchet (second connecting member) in the axial direction. And the guide 20 is integrated to the support portion 15 in a state of being supported by each other on inner and outer sides rotatably. The support portion 15 surrounds the circular ring portion 22 on an outer peripheral side thereof at a position on an outer side in the radius direction of the inner peripheral teeth face 12a. Therefore, a wall thickness in the radius direction of the circular cylinder portion 12 is operated to increase. Therefore, as shown in FIG. 6, a substantial wall thickness in the radius direction of the circular cylinder portion (peripheral edge portion) 12 of the inner peripheral teeth face 12a meshed with and locked by the poles (lock members) 30 can be increased, and therefore, a support strength in mesh locking of the circular cylinder portion 12 is increased. Therefore, even when the reclining apparatus (connecting apparatus) 4 is downsized, the lock strength can be guaranteed.

Further, the circular cylinder portion 12 and the support portion 15 are formed with the ratchet 10 by half blanking process in the plate thickness direction of the ratchet 10. The circular cylinder portion 12 and the support portion 15 respectively project in the axial direction with shapes of circular cylinders and arranged in the axial direction with the stepped shape therebetween. In this way, the circular cylinder portion 12 and the support portion 15 can be formed excellently only by the half blanking process in the plate thickness direction of the ratchet 10. In order to integrate the guide (small diameter side member) 20 and the ratchet (large diameter side member) 10 by the holding member 70, first, the seat face portion of the holding member 70, formed in the flange-like shape, contacts the outer peripheral portion of the guide 20. Next, the ratchet 10 is set on the guide 20, thereafter, folding to bend the opening end portion on the side of the receiving port of the holding member 70 to the inner side in the radius direction. Thus, the holding member 70 couples the guide 20 and the ratchet 10.

The calking processing of the end portion of the holding member 70 is carried out in a state of being supported by a receive die (support face Ja of integrating jig J) contacting the back side face of the seat face portion in the flange-like shape. Therefore, when the respective constituent parts are successively set to the holding member 70 in the gravitational force direction and finally subjecting the upper end portion of the holding member 70 to the calking processing, the respective parts can be integrated to be able to be prevented from being detached without carrying out the reversing operation for making the total of the parts upside down in the midst of integration process.

While the invention has been described with reference to specific configurations, it will be apparent to those skilled in the art that many alternatives, modifications and variations may be made without departing from the scope of the present invention. Accordingly, the present invention is intended to embrace all such alternatives, modifications and variations that may fall within the spirit and scope of the appended claims. For example, the above aspects should not be limited to those configurations, but may be modified as described below.

In FIG. 1, the vehicular seat includes the reclining apparatus 4 of connecting the seat back 2 to the seat cushion 3 to be able to adjust the back rest angle. However, there may be a configuration including a connecting apparatus to connect the seat back 2 to a vehicle body floor to be able to adjust a back rest angle as the connecting apparatus.

There may be a configuration including a connecting apparatus for rotating a seat main body in a turning direction relative to the vehicle body floor. Or there may be a configuration including a connecting apparatus to be able to make an apparatus rise or fall or pivot. The ottoman apparatus may lift a knee portion of a seated person from a lower side to the seat cushion 3 or the vehicle body floor to support the below the knee portion.

Figure 13:
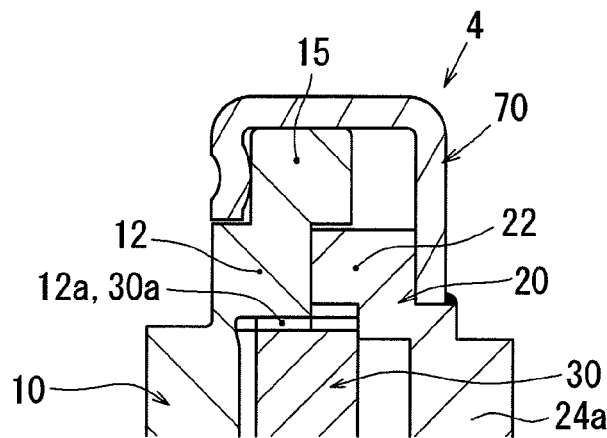
FIG. 13 is a part cross-sectional view of a reclining apparatus of another configuration.

As shown in FIG. 13, the holding member 70 may be integrally coupled to fix to the guide 20. Further, the holding member 70 can integrally be bonded to fix to the guide 20 by welding.

Figure 14:
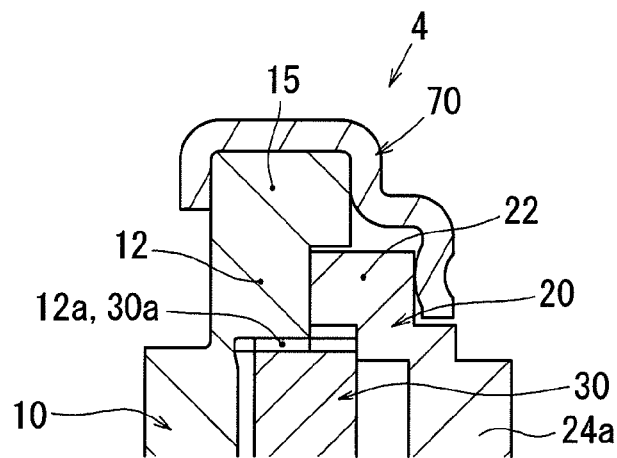
FIG. 14 is a part cross-sectional view of a reclining apparatus of another configuration.

As shown in FIG. 14, the support portion 15 of the ratchet 10 may be formed in a thick-walled shape to cover a total of an outer peripheral portion of the circular cylinder portion 12. Thereby, a support strength of the ratchet 10 in mesh locking of the circular cylinder portion 12 can further be increased.

Figure 15:
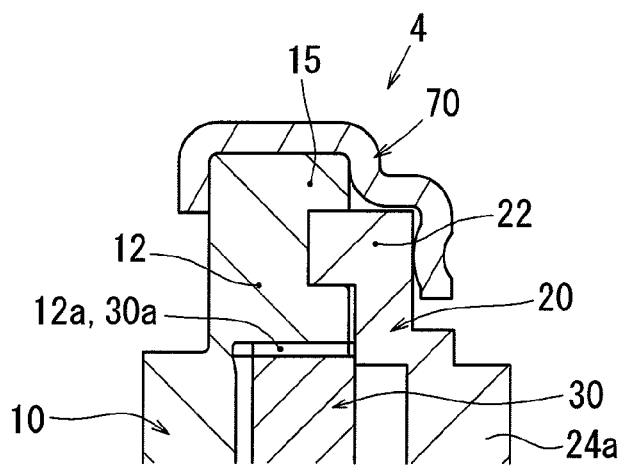
FIG. 15 is a part cross-sectional view of a reclining apparatus of another configuration.

As shown in FIG. 15, the support portion 15 may be provided with a recess in a ring-like shape recessed in the axial direction to the inner disk side of the circular cylinder portion 12 formed to be thick-walled in the radius direction.

What is claimed is:

1. A connecting apparatus for rotatably connecting two object members of a vehicular seat relative to each other comprising:

first and second connecting members integrated to be able to rotate relative to each other, the first connecting member integrally connected to one of the two object members, the second connecting member integrally connected to the other one of the two object members;

a lock member arranged between the connecting members and integrated to the first connecting member to be supported in a circumferential direction, the lock member being able to lock the relative rotation between the connecting members when outer peripheral teeth mesh with inner peripheral teeth formed at the second connecting member; and an operating member moving the lock member between a mesh state and a release state, in the mesh state the outer peripheral teeth of the lock member mesh with the inner peripheral teeth of the second connecting member, in the release state the outer peripheral teeth are released from the inner peripheral teeth;

wherein the second connecting member is formed with a circular cylinder portion and a support portion each respectively having a circular cylinder shape, the circular cylinder portion being formed with the inner peripheral teeth at an inner peripheral face thereof, the support portion being arranged at an outer side in a radius direction relative to the circular cylinder portion and projects from the circular cylinder portion in an axial direction towards the first connecting member, the support portion receiving a circular ring portion formed at the first connecting member to surround the circular ring portion from an outer peripheral side to support each other to be able to rotate relative to each other, and the circular ring portion of the first connecting member is spaced from the outer peripheral teeth of the lock member in both the release state and the mesh state.

2. The connecting apparatus as in claim 1, wherein:

the inner peripheral teeth of the second connecting member are formed at the inner peripheral face of the circular cylinder portion by subjecting the second connecting member to half blanking in a plate thickness direction, and the support portion formed at the position on the outer side in the radius direction of the inner peripheral teeth face of the circular cylinder portion is formed in a circular cylinder shape in the axial direction from the circular cylinder portion by subjecting the second connecting member to half blanking in the plate thickness direction.

3. The connecting apparatus as in claim 1, wherein:

the respective connecting members are held in the axial direction by a holding member integrated to surround outer peripheral portions of the connecting members, the holding member is coupled to the second connecting member by bending an end portion of the holding member to an inner side in the radius direction in a state of touching an outer peripheral portion of the first connecting member to a previously formed seat face portion of the holding member in a shape of a flange having a face in the axial direction, and integrating the second connecting member on the first connecting member.

4. The connecting apparatus as in claim 1, wherein:

the operating member is slidably movable to fix the lock member in the mesh state and the release state.

* * * * *

UNITED STATES PATENT AND TRADEMARK OFFICE
CERTIFICATE OF CORRECTION

PATENT NO. : 7,950,742 B2
APPLICATION NO. : 12/408947
DATED : May 31, 2011
INVENTOR(S) : T. Endo et al.

Page 1 of 1

It is certified that error appears in the above-identified patent and that said Letters Patent is hereby corrected as shown below:

In column 12, line 13 (claim 2, line 8) of the printed patent, please delete the word "face".

Signed and Sealed this
Third Day of January, 2012

David J. Kappos
*Director of the United States Patent and Trademark Office*